(12) United States Patent
Błachut et al.

(10) Patent No.: US 12,486,877 B2
(45) Date of Patent: Dec. 2, 2025

(54) ROTOR CLIP FOR BRAKE ASSEMBLY

(71) Applicant: GOODRICH CORPORATION, Charlotte, NC (US)

(72) Inventors: Aleksander Andrzej Błachut, Ozimek (PL); Mirosław Stanisław Sosnowski, Mirków (PL); Lukasz Stefan Paluszkiewicz, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 396 days.

(21) Appl. No.: 18/320,580

(22) Filed: May 19, 2023

(65) Prior Publication Data

US 2023/0407933 A1 Dec. 21, 2023

(30) Foreign Application Priority Data

Jun. 8, 2022 (EP) .................................... 22461565

(51) Int. Cl.
*F16D 65/12* (2006.01)
*F16D 65/02* (2006.01)

(52) U.S. Cl.
CPC ......... *F16D 65/123* (2013.01); *F16D 65/126* (2013.01); *F16D 2065/1372* (2013.01); *F16D 2065/1392* (2013.01)

(58) Field of Classification Search
CPC ... F16D 65/123–128; F16D 2065/1372; F16D 2065/1392
USPC .......................................... 188/71.5, 218 XL
See application file for complete search history.

(56) References Cited

U.S. PATENT DOCUMENTS

| 4,557,356 | A | | 12/1985 | Petersen | |
|---|---|---|---|---|---|
| 4,784,246 | A | * | 11/1988 | Edmisten | F16D 65/126 188/218 XL |
| 4,863,001 | A | * | 9/1989 | Edmisten | F16D 65/126 188/218 XL |
| 7,303,055 | B2 | * | 12/2007 | Eckert | F16D 55/36 188/218 XL |

(Continued)

FOREIGN PATENT DOCUMENTS

| EP | 0161200 | 11/1985 |
|---|---|---|
| EP | 3072610 | 9/2016 |
| EP | 3168491 | 5/2017 |

(Continued)

OTHER PUBLICATIONS

European Patent Office, European Search Report dated Oct. 31, 2022 in Application No. 22461565.8.

*Primary Examiner* — Christopher P Schwartz
(74) *Attorney, Agent, or Firm* — SNELL & WILMER L.L.P.

(57) ABSTRACT

A clip assembly for a rotor disk of a brake assembly, the clip assembly comprising: a half-cap clip arranged to fit over an end of a lug of the rotor disk, the half-cap clip having two opposing sides and an end across the two opposing sides, and a top and bottom surface, the top and bottom surfaces, the sides and the end defining a receptacle to receive the rotor lug, the half-cap clip having an aperture in each of the sides; and a pin having a pin head and a pin body extending from the pin head along an axis (A) of the pin, the pin having a cross-section defining an elongate shape having rounded ends; and wherein the apertures in the sides of the half-cap clip are shaped to receive the pin body.

15 Claims, 6 Drawing Sheets

(56) References Cited

U.S. PATENT DOCUMENTS 9,897,153 B2 2/2018 Tremblay
2023/0407934 A1* 12/2023 Blachut ................ F16D 65/126

FOREIGN PATENT DOCUMENTS

| WO | 2005106279 | 11/2005 |
| WO | 2007118254 | 10/2007 |

* cited by examiner

Half cap clip

ROTOR CLIP FOR BRAKE ASSEMBLY

CROSS-REFERENCE TO RELATED APPLICATIONS

This application claims priority to, and the benefit of, EP Patent Application No. 22461565.8, filed Jun. 8, 2022 and titled "ROTOR CLIP FOR BRAKE ASSEMBLY," which is incorporated by reference herein in its entirety for all purposes.

FIELD

The present disclosure relates to a clip for the rotor of a brake assembly.

BACKGROUND

Braking assemblies for applying a braking force to a rotating body e.g. a wheel, are well known and typically comprise a brake stack of alternating rotor and stator disks. The braking assembly is actuated by applying a force to an actuator e.g. a piston which applies force to a pressure plate which compresses the rotor and stator disks of the brake stack together to cause deceleration and braking by friction. Typically, the rotor disks are provided with circumferential drive lugs via which the compressive force is applied to the rotor disks. Such braking mechanisms are well known and will not be described further in any detail. Brake assemblies operating in this way are common in aircraft and other vehicles. Where a high braking force is required, such as in aircraft, the rotor disks have to be made of a strong, heavy duty material such as a strong steel material or, more recently, carbon material. Carbon is preferred in many applications e.g. in aircraft, because it is more lightweight than steel for the same strength. Reduced weight of parts in or on aircraft allow for a reduction in fuel consumption and, in turn, reduced $CO_2$ emissions. Because of the material used, the rotor disks are expensive parts. In order to prolong the life of these disks, rotor clips are typically provided on the outer circumference of the disk e.g. on the drive lugs to provide some protection against wear of the rotor disk material. The clips transfer the drive force to the rotor drive lug. These clips, when they become worn, can be easily and relatively inexpensively replaced, allowing the more expensive rotor disks to be reused and extending their life.

Various designs for rotor clips are known, these include a spring clip secured over the rotor drive lug by means of a rivet or similar fastener. Half cap clips are also known, which fit over just the end part of the drive lug. Floating clips are also known, which are positioned between drive lugs and allow for some movement of the clip during braking. Again, these clips are secured in position by means of rivets or pins or similar fasteners. Usually, two rivets are passed through aligned holes in the clip and the lug and are secured by rivet heads.

As high torques are transferred by the clip, the fasteners securing the clips in place are also subject to high forces acting perpendicular to the force to be transmitted to the clip and these rivets/pins are subject to bending or breakage due to these forces. Furthermore, such fasteners will have a head that protrudes beyond the surface of the clip which can also be damaged or can cause damage to other parts. The force on the fasteners and the forces exerted by the fasteners in known designs might not be equally distributed and hot spots can be created where the fasteners exert forces on the clip or the rotor, e.g. at the back of the rivet heads, thus causing damage to the clip and/or rotor disk. Rivets that can provide the required strength and security are expensive and difficult to manufacture and use. The use of these rivets also introduces the risk of damage to the rotor disk material when the clips are being replaced. To assemble the clip, several steps are required—the clip has to be placed over the rotor lug and the holes in the clip aligned with the holes through the lug, then two separate pins or rivets need to be passed through the holes and secured with a further head or nut.

There is a need for an improved clip that avoids or mitigates these problems

SUMMARY

According to the disclosure, there is provided a clip assembly for a rotor disk of a brake assembly, the clip assembly comprising: a half-cap clip arranged to fit over an end of a lug of the rotor disk, the half-cap clip having two opposing sides and an end across the two opposing sides, and a top surface, the top surface, the sides and the end defining a receptacle to receive the rotor lug, the half-cap clip having an aperture in each of the sides; and a pin having a pin head and a pin body extending from the pin head along an axis of the pin, the pin having a cross-section defining an elongate shape having rounded ends; and wherein the apertures in the sides of the half-cap clip are shaped to receive the pin body.

Also provided is a method for assembling such a clip, as well as a rotor disk, a brake assembly and a wheel assembly having such a clip design.

BRIEF DESCRIPTION OF THE DRAWINGS

Examples of the clip according to the disclosure will now be described with reference to the drawings. It should be noted that other examples are possible within the scope of the claims.

DETAILED DESCRIPTION

Figure 1:
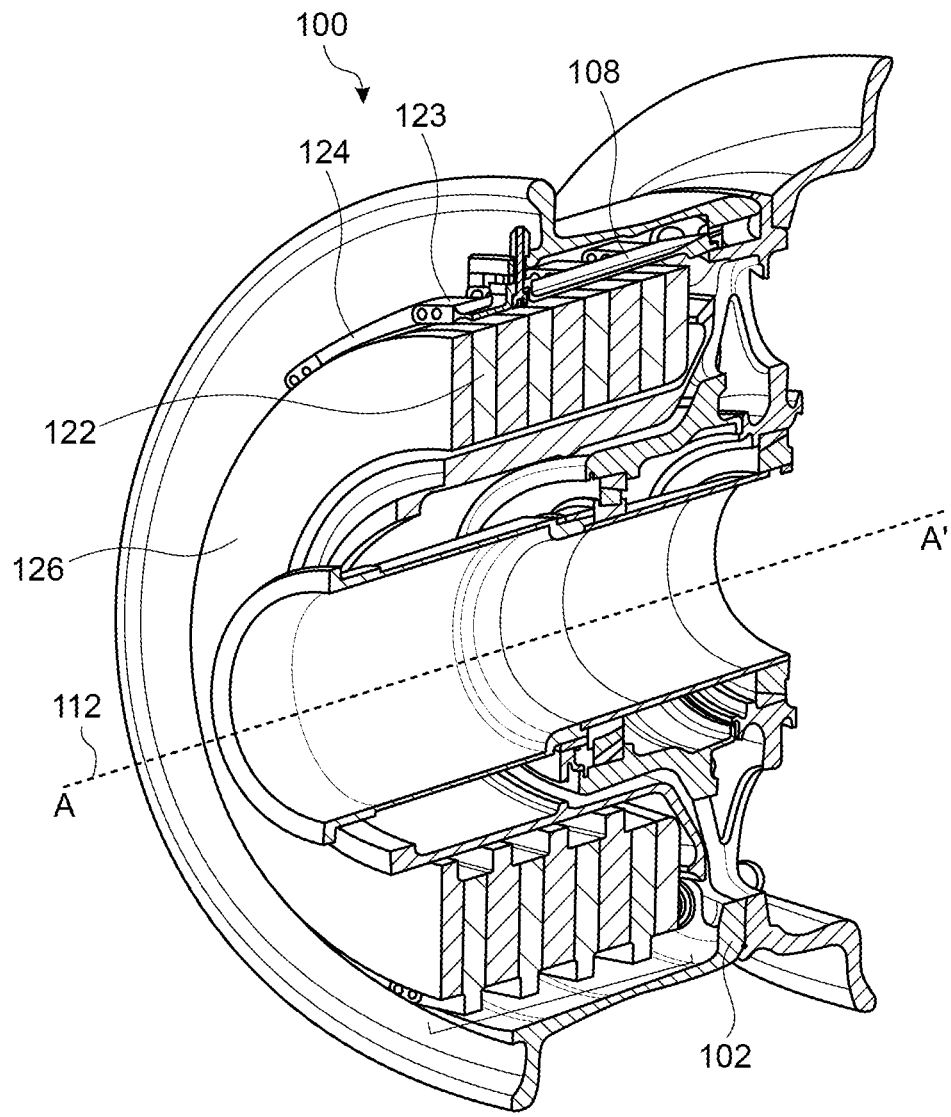
FIG. 1 is a perspective view of a section through a typical brake assembly.

Referring first to FIG. 1, a wheel brake assembly is shown for purposes of explanation. The brake assembly 100 is mounted within a wheel 102 which rotates about an axis A-A' 112. The brake assembly comprises a stack of alternate rotor disks 122 and stator disks 126 with the rotor disks rotatable with the wheel, and relative to the stator disks, about axis 112. To decelerate or brake rotation of the wheel pressure is applied by means of actuators in the axial direction A-A' to the brake stack to compress the rotor and stator disks together, causing friction between the rotor and stator disks and thus slowing the wheel. The rotor disks have rotor lugs 124 defined around their circumference and extending radially outwards with respect to the axis of rotation 112. Slots are defined between adjacent lugs. Torque bars 108 acts as drive lugs that engage the wheel with the rotor disks via the rotor lugs.

As mentioned above, in order to protect the rotor disk material against wear, the rotor lugs 124 may be provided with protective clips 123 via which the torque is transferred from the torque bars 108 to the rotor lugs 124, and hence to the rotor disk. During use, the operation of the brake assembly will cause the brake clips 123 to wear before the rotor disk material wears, and the clips 123 can be removed and new clips fitted, without needing to replace the entire rotor disk.

Conventionally, these clips are attached to the rotor disks or rotor lugs by means of rivets that pass through the rotor lug from one side to the other. An example of such known clip designs is shown in FIG. 2.

Figure 2:
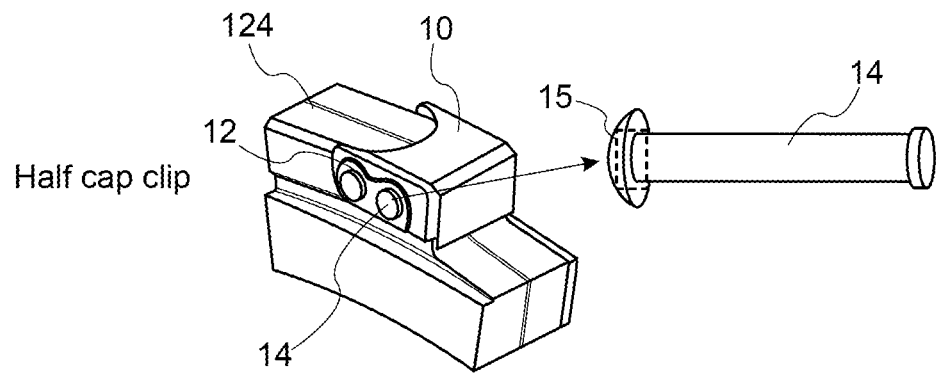
FIG. 2 shows a conventional clip with a rivet fastener.

FIG. 2 shows a so-called half cap clip 10 which has at least one rivet aperture 12 (in this example, there are two rivet apertures 12). The clip 10 is shaped to fit over the end of a rotor lug 124 and is secured to the lug by means of rivets 14 secured to the side of the lug through the clip apertures 12. As mentioned above, these rivets pass through the width of the rotor lug and can be subjected to bending forces. They can be expensive and difficult to manufacture and install and a hotspot of force can occur around the region of the rivet head 15.

The clip assembly 300 according to the present disclosure, described below with reference to FIGS. 3 to 11, provides an alternative fastener to the two rivets for securing the clip to the lug, which is simpler to assemble and allows for improved stress distribution, less risk of damage to the carbon of the brake and less risk of bending of the fastener.

The clip assembly 300 according to the disclosure includes a half cap clip 500 configured to fit over the end of a rotor lug in a manner similar to the conventional clip described above. As with the conventional clip, the clip has a cap body with opposing side walls 512, 514 and an end wall 516 extending between the side walls, the cap defining a recess 518 to receive a portion of a rotor lug. The clip has a shaped aperture 511 in each of its side walls 512, 514 that fit over the sides of the lug. The apertures are shaped to match and align with a correspondingly shaped passage 400 through the lug when the clip is positioned over the lug. The assembly also includes a shaped pin 200 having a head 201 and a pin body 202 extending along an axis X of the pin from the head. The pin body has an elongate cross-sectional shape (in the plane perpendicular to the axis) having opposing rounded ends 204, 206. In one example, the cross-section has two opposing rounded end portions 212, 214 and a narrower middle portion 216 i.e. defining a dumbbell or peanut shape, but other elongate shapes are also possible. The pin head 201 extends beyond the pin body in the cross-sectional plane and may have a shape corresponding to, but larger than, the cross-sectional shape of the pin body. The head could, however, have a different shape e.g. ovate.

The clip apertures 511 and the passage 400 through the lug have a shape substantially corresponding to that of the cross-section of the pin 200 but may be dimensioned slightly larger to simplify passage of the pin through the apertures and the passage.

Figure 3:
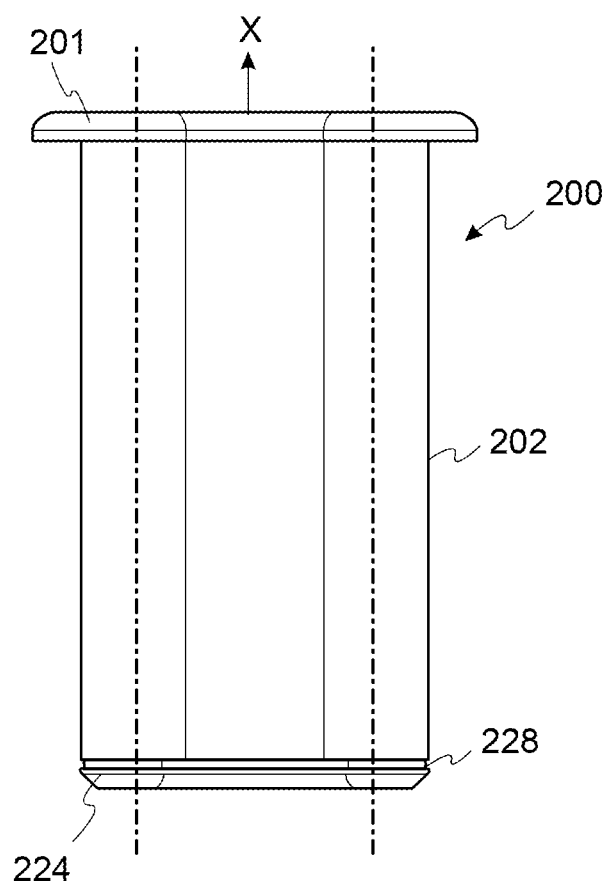
FIG. 3 is a side view of a pin of a clip assembly according to the disclosure.
Figure 4:
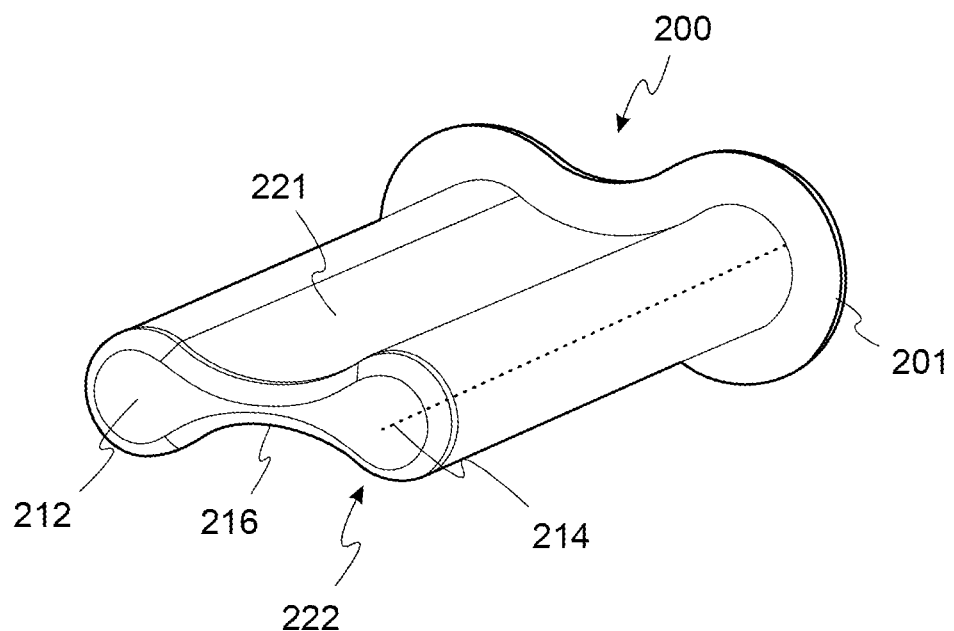
FIG. 4 shows a perspective view of the pin of FIG. 3 in 3D.
Figure 5:
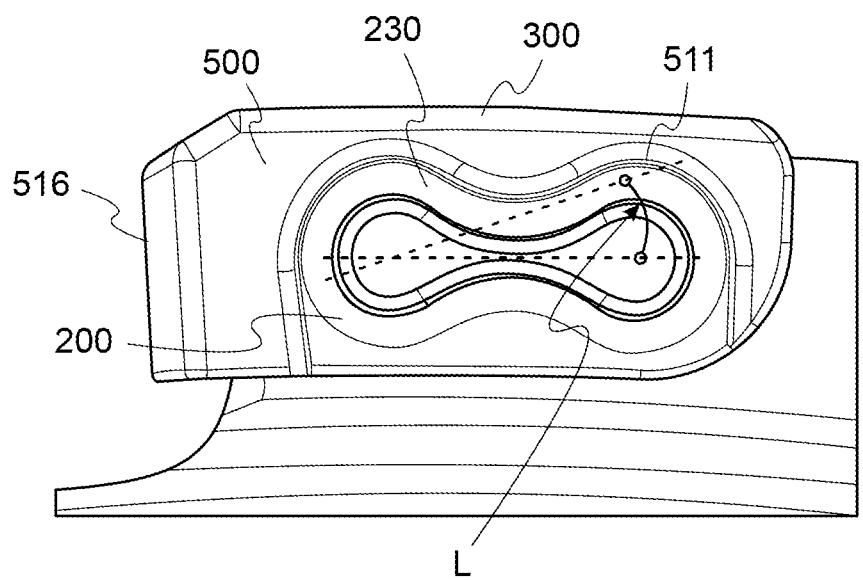
FIG. 5 shows a side view of a clip assembly according to the disclosure mounted to a rotor lug.
Figure 6:
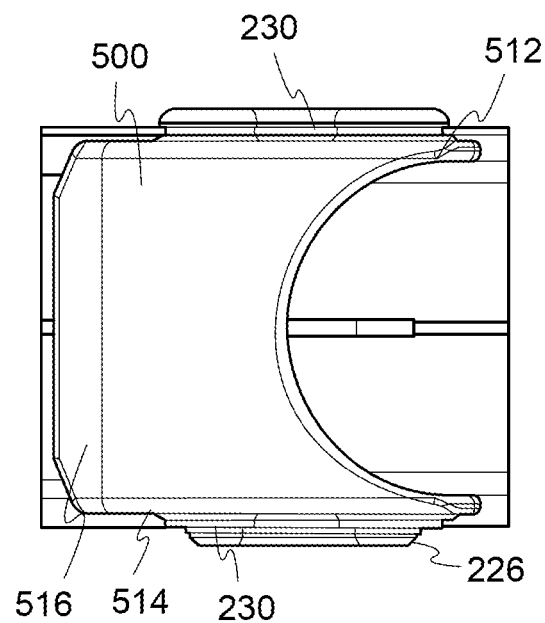
FIG. 6 is a top view of an assembly as shown in FIG. 5.
Figure 7:
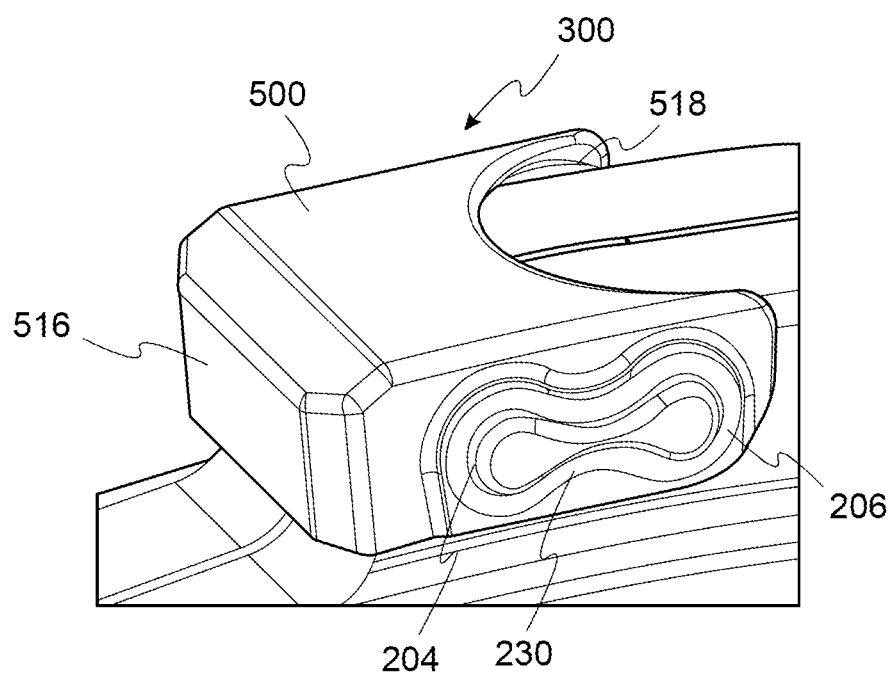
FIG. 7 shows a perspective view of the assembly of FIG. 5 from one side.
Figure 8:
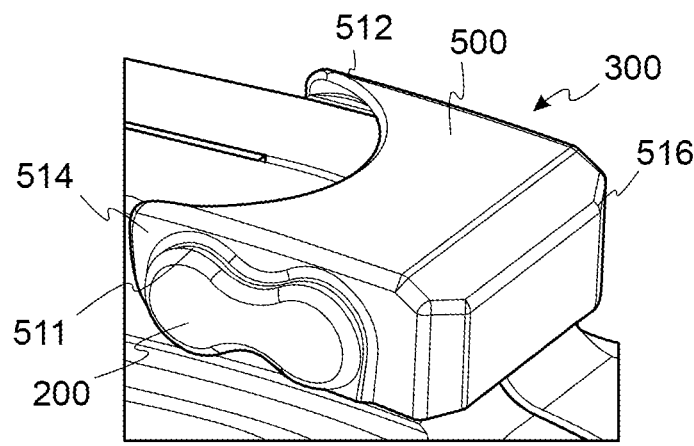
FIG. 8 shows a perspective view of the assembly of FIG. 7 from the other side.
Figure 9:
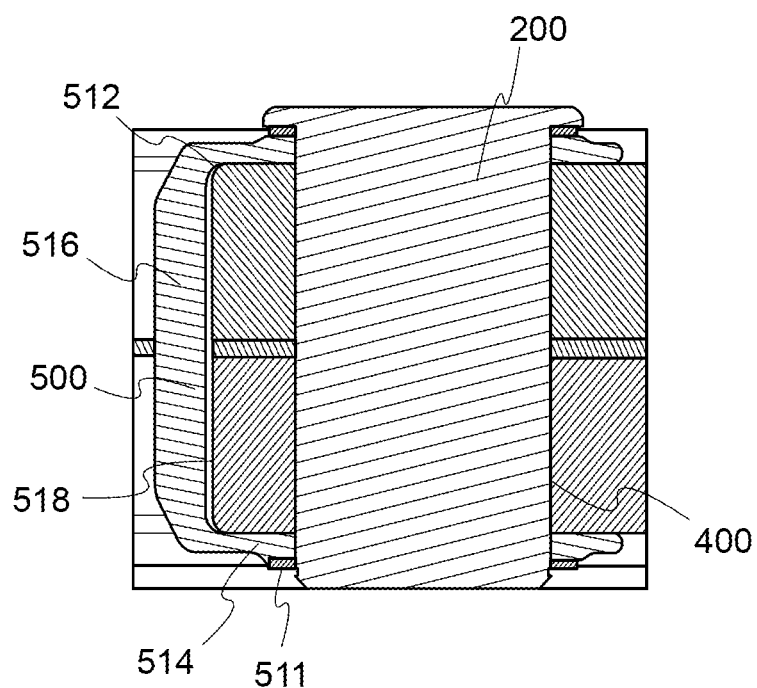
FIG. 9 shows a top sectional view of the assembly.
Figure 10:
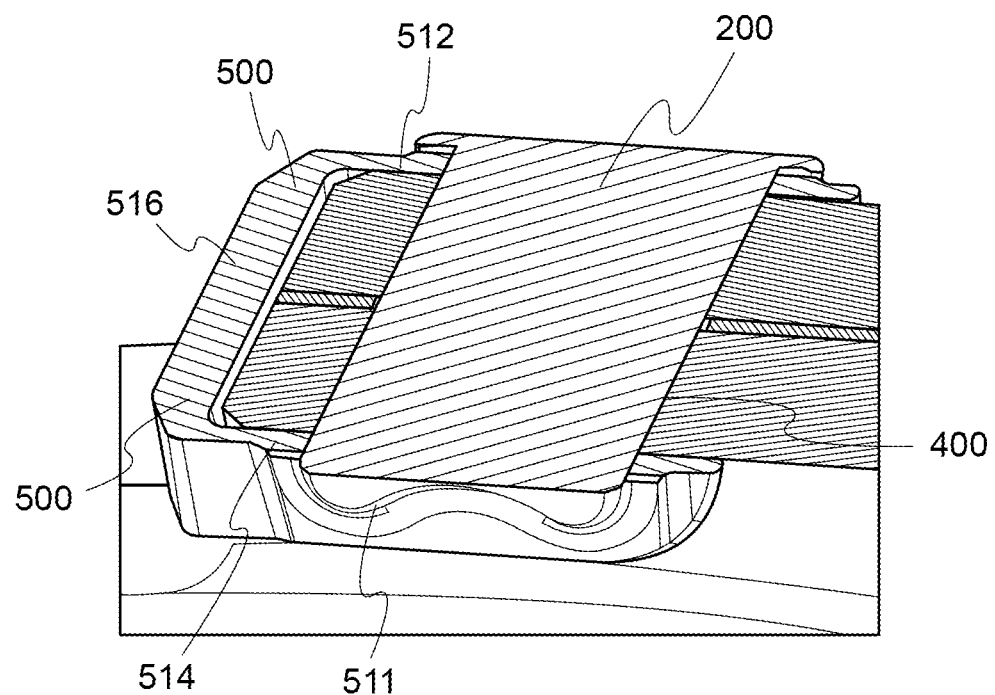
FIG. 10 shows a side perspective sectional view of the assembly.
Figure 11:
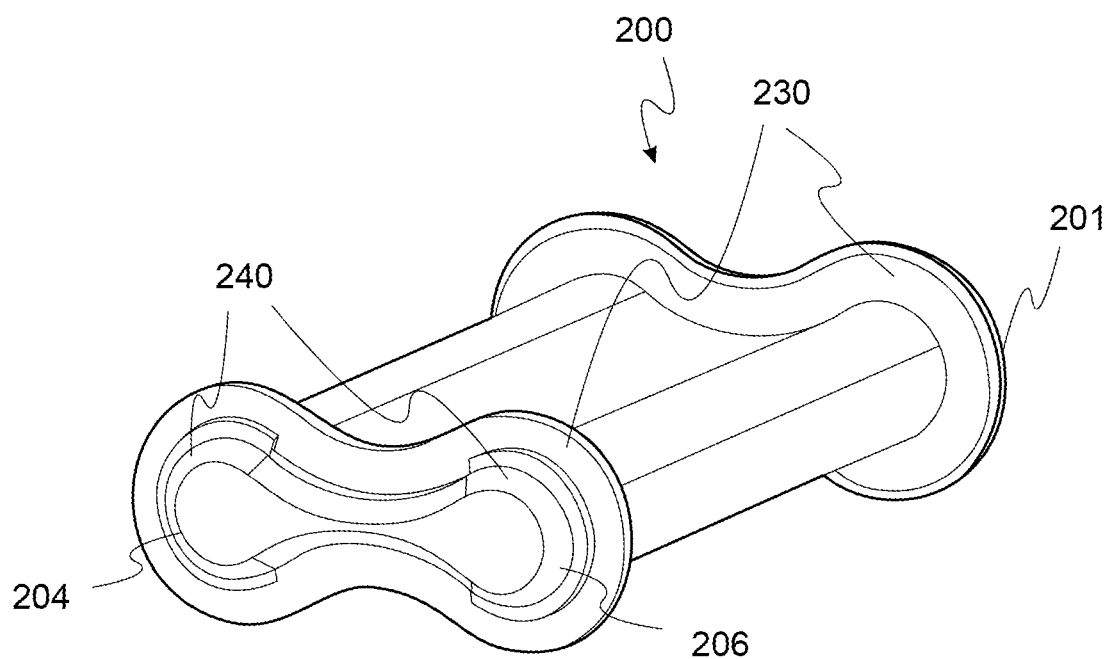
FIG. 11 shows a view of the pin such as shown in FIG. 4 but prepared for assembly according to one example.

The shaped pin 200 can be best seen in FIGS. 3 and 4. The pin has a substantially flat pin head 201 and a pin body 202 that extends from the head along the pin axis X. The pin head extends radially beyond the edges of the pin body. The pin body, in cross-section (i.e. in the plane perpendicular to the pin axis), defines an elongate shape with rounded ends 204, 206. The cross-sectional shape could be an elongate oval shape. A preferred shape, however, has wider end portions 212, 214 and a narrower middle portion 216, forming a dumbbell or 'peanut' shape as shown in the FIGS. An advantage of this shape is that less pin material is used and the end portions provide the necessary strength but the overall pin has a less damaging effect on the structural integrity of the carbon material of the rotor lug. The effect of this cross-section is that the pin has a shape that is rounded at its outer edges and undulates across its major surfaces 221, 222. The end 224 of the pin body opposite the head can be configured to receive a securing cap 226 that fits over the end of the pin after it has been inserted through the lug passage and the cap apertures, described further below, to prevent it withdrawing out of the passage. This cap 226 may have a size and shape similar to or the same as the pin head, although other shapes are also feasible. In the example shown, the end 224 of the pin body 202 is provided with a groove 228 to allow the cap to be fitted and secured to the pin by e.g. a snap fit. The cap can then be removed if it is desired to remove the pin, so as to remove the clip.

To mount the clip assembly to the end of the rotor lug, first the half clip 300 is fitted over the end of the lug as with conventional clips and the apertures in the sides of the clip are aligned with the openings at the ends of the passage through the lug. The pin 200 is then inserted from one side of the clip, pushing the end 224 of the pin through the aperture on one side of the clip, through the lug passage and out through the aperture in the other side of the clip. The length of the pin should be slightly longer than the combined length of the sides of the clip and the rotor lug such that when the pin is fully inserted, the pin head 201 abuts against one side of the clip extending across the aperture, and the other end 226 of the pin protrudes through the aperture in the other side of the clip by enough to attach the cap 226 or other finishing to abut against the other side of the clip across the aperture in that side. Once the pin has been pushed through the passage, the cap or other finish is provided to prevent the pin inadvertently pulling back out.

To improve the securing and sealing of the pin, the pin may be provided with a washer 230 at each end—one directly behind the head 201 and the other around the opposite end 224 to seal against the clip apertures. Additional sealing may be provided by adding a sealant 240 e.g. an insulating foam or the like between the pin body and the washer.

In one example, the dimensions of the pin and the washer/sealant may be such as to allow the angle L of location of the pin in the apertures/passage to be varied to achieve the greatest contact area between the pin and the rotor lug passage. This allows for an optimal stress distribution across the carbon material of the lug and is therefore less harmful to the carbon.

Using the elongate cross-sectional pin, the clip assembly can be mounted to the lug using only a single pin instead of two rivets, which allows simpler and quicker assembly. Furthermore, the stress distribution is improved resulting in less damage to the pin and to the carbon lug.

The invention claimed is:

1. A clip assembly for a rotor disk of a brake assembly, the clip assembly comprising:
a half-cap clip arranged to fit over an end of a lug of the rotor disk, the half-cap clip having two opposing sides and an end across the two opposing sides, and a top surface, the top surface, the sides and the end defining a receptacle to receive the rotor lug, the half-cap clip having an aperture in each of the sides; and a pin having a pin head and a pin body extending from the pin head along an axis (X) of the pin, the pin having a cross-section defining an elongate shape having rounded ends;

and wherein the apertures in the sides of the half-cap clip are shaped to receive the pin body.

2. The clip assembly of claim 1, wherein the cross-section of the pin body defines an elongate shape having rounded ends, opposing end portions tapering to a narrower middle portion.

3. The clip assembly of claim 1, wherein the pin head extends radially outwards beyond the extent of the pin body.

4. The clip assembly of claim 1, where the pin head has a cross-sectional shape corresponding to, but larger than the cross-section of the pin body.

5. The assembly of claim 1, wherein the pin body has an end opposite the pin head, the end configured to receive a cap.

6. The assembly of claim 5, further comprising the cap.

7. The assembly of claim 6, further comprising a sealant between each washer and the pin body.

8. The assembly of claim 1, the pin further comprising a washer at each end of the pin body.

9. A rotor disk of a brake assembly provided with a plurality of rotor lugs around and radially extending from its circumference; and a clip assembly as claimed in claim 1 mounted to each rotor lug, wherein a passage is provided through the lug, having a shape corresponding to the shape of the pin body, through which the pin body passes, the half-cap clip of each clip assembly mounted to the lug such that the apertures align with the passage for passage of the pin therethrough.

10. The brake assembly comprising a plurality of rotor disks as claimed in claim 9 and a plurality of stator disks, the stator disks and the rotor disks arranged alternately to form a brake stack.

11. A wheel assembly comprising a wheel having an inner diameter within which is mounted to the brake assembly as claimed in claim 10.

12. The wheel assembly as claimed in claim 11, the wheel having an outer diameter onto which a tire is mounted.

13. The wheel assembly as claimed in claim 11 being a wheel assembly for the landing gear of an aircraft.

14. A method of fitting a clip assembly as claimed in claim 1 to a rotor disk of a brake assembly, the method comprising fitting the half-cap clip over an end of a rotor lug of the rotor disk such that the apertures align with a passage through the lug, inserting the pin through a first of the apertures and through the passage and out through the other of the apertures until the pin head abuts against the side of the clip and the other end of the pin extends from the other side of the clip.

15. The method of claim 14, further comprising attaching a cap to the other end.

\* \* \* \* \*